UNITED STATES PATENT OFFICE.

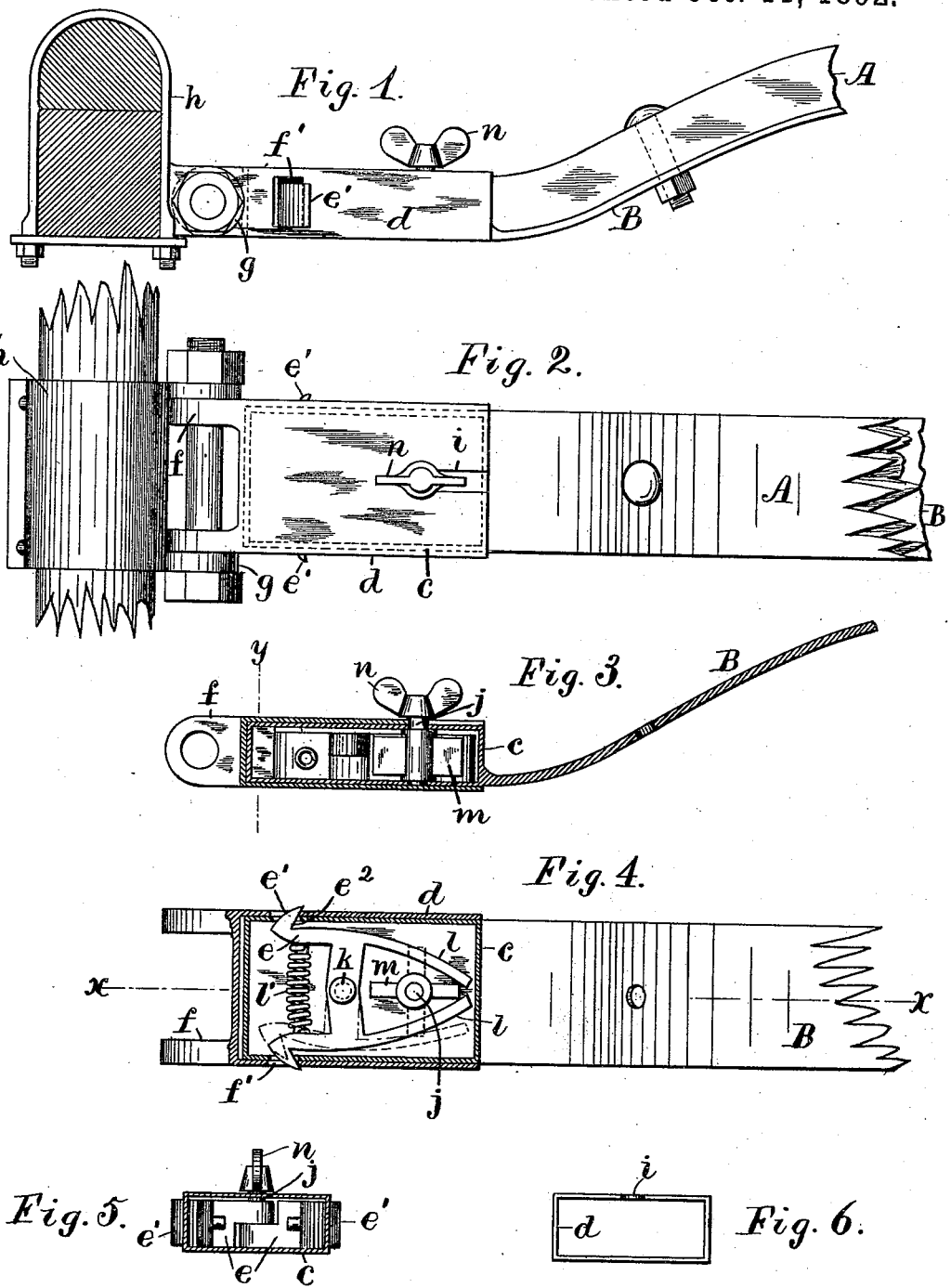

WINTHROP M. SAYRE, OF SOUTH ORANGE, NEW JERSEY.

THILL-COUPLING.

SPECIFICATION forming part of Letters Patent No. 484,052, dated October 11, 1892.

Application filed January 16, 1892. Serial No. 418,262. (No model.)

*To all whom it may concern:*

Be it known that I, WINTHROP M. SAYRE, a citizen of the United States, residing in South Orange, Essex county, New Jersey, have invented certain new and useful Improvements in Thill-Couplings, fully described and represented in the following specification and the accompanying drawings, forming a part of the same.

The object of this invention is to furnish an effective and expeditious means of coupling the thills of wagon-shafts detachably to the wagon-axle; and the invention consists in the particular construction hereinafter shown and described.

In the annexed drawings only one of the couplings applied to one of the thill-irons is shown, Figure 1 being a side view of the thill-coupling with one of the thill-irons. Fig. 2 is a plan of the same. Fig. 3 is a section of the thill-coupling on line $x\ x$ in Fig. 4. Fig. 4 is a plan of the coupling with the cover removed. Fig. 5 is a cross-section on line $y\ y$ in Fig. 3; and Fig. 6 is a front view of the socket, which is hinged to the axle-clip.

A is the base of one of the shafts; B, the thill-iron bolted to the same and provided upon the end with a rectangular box $c$, fitted to slip freely within a socket $d$, which is jointed by lugs $f$ to ears $g$ upon the axle-clip $h$. The box is provided with spring-jaws $e$, projecting from its sides and engaging with holes $f'$ in the sides of the socket. The socket is of rectangular cross-section, as shown in Fig. 6, wholly closed upon the top, bottom, and sides, with a slot $i$ in the front end of the top to admit a spindle $j$, by which the jaws $e$ are retracted. The jaws are formed as levers pivoted within the box $c$ upon a common fulcrum $k$ and are pressed normally outward through suitable openings in the sides of the box by a spring $l'$. The levers are provided with tail-pieces $l$, projected beyond the fulcrum, and a button $m$ is pivoted upon the spindle $j$ between the tail-pieces in such relation that it may operate when turned crosswise, as shown in dotted lines in Fig. 4, to separate the tail-pieces and retract the ends of the jaws within the box. The spindle $j$ projects through the top of the box $c$ and a thumb-piece $n$ is attached to its outer end, the spindle slipping into the slot $i$ in the socket when the box is inserted therein.

Fig. 4 shows the jaws in full lines engaged with the sides of the socket, and one of the jaws is shown in dotted lines with the tail-piece pressed outward and the jaw retracted within the box. The ends of the jaws are formed as hooks to catch in the holes $f'$ and their outer faces $e'$ are sloped toward the outer end of the box, so that when the box is slipped within the socket $d$ the jaws are automatically pressed inward in opposition to the spring $l'$. When the box is forced to the bottom of the socket, the jaws are pressed outward by the spring $l'$ into the holes $f$ and the thill is then locked into the socket. The front sides $e^2$ of the hooks are sloped to catch firmly in the walls of the socket, and the draft upon the thills is thus prevented from detaching the jaws until the thumb-piece $n$ is rotated. This construction permits the insertion of both the shaft-boxes $c$ into the sockets $d$ simultaneously and secures their automatic locking within the sockets by merely pushing them to the bottom of the same.

To disengage the shafts from the wagon-axle C, the thumb-pieces $n$ are turned simultaneously, and the hooks of the jaws are then retracted, and the boxes $c$ can be drawn out of their sockets.

I am aware that a detachable pole has been connected with the "hounds" of a wagon by jaws which are pivoted in a sliding block and may be operated by the driver through the agency of a cord.

The object of such invention is to detach the pole in case the horse runs away; but my invention is for a different purpose and is intended simply to detach the shafts of a wagon without removing the bolts from the thill-couplings.

From the foregoing description of the operation of my improvement it is obvious that the direction of the arms $l$ and jaws $e$ with relation to the fulcrum $k$ may be reversed and the location of the holes $f$ correspondingly changed without departing from my invention, although I consider it preferable to employ the arrangement shown and described specifically herein.

Having thus set forth the nature of my invention, what I claim herein is—

1. The combination, with the axle-clip, of the socket $d$, pivoted thereto and provided with the openings $f$, and the thill-iron having the box $c$, containing the pivoted jaws, having the arms $l$ and the hooks projected from the opposite sides of the box and provided with the button $m$, adapted to separate the arms and retract the hooks, substantially as herein set forth.

2. The combination, with the axle-clip, of the socket $d$, pivoted thereto and provided with the openings $f$, and the thill-iron having the box $c$, containing the pivoted jaws, having the arms $l$ and the hooks projected from the opposite sides of the box and provided with the button $m$, adapted to separate the arms, and the hooks being formed with outer faces $e'$, sloped toward the end of the box to slip automatically within the socket, as and for the purpose set forth.

In testimony whereof I have hereunto set my hand in the presence of two subscribing witnesses.

WINTHROP M. SAYRE.

Witnesses:
HENRY J. MILLER,
JOHN VAN NEST, Jr.